United States Patent
Perrin et al.

(10) Patent No.: US 10,464,085 B2
(45) Date of Patent: Nov. 5, 2019

(54) FOAMING DEVICE WITH CONTROLLED OUTLET

(71) Applicant: NESTEC S.A., Vevey (CH)

(72) Inventors: Alexa Perrin, Savigny (CH); Alexandre Perentes, Pully (CH); Lucio Scorrano, Yverdon-les-Bains (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/756,856

(22) PCT Filed: Aug. 18, 2016

(86) PCT No.: PCT/EP2016/069565
§ 371 (c)(1),
(2) Date: Mar. 1, 2018

(87) PCT Pub. No.: WO2017/036806
PCT Pub. Date: Mar. 9, 2017

(65) Prior Publication Data
US 2018/0243766 A1   Aug. 30, 2018

(30) Foreign Application Priority Data
Sep. 4, 2015  (EP) .................................. 15183882

(51) Int. Cl.
*A47J 43/046* (2006.01)
*B05B 7/00* (2006.01)
*A47J 31/44* (2006.01)

(52) U.S. Cl.
CPC ........... *B05B 7/0018* (2013.01); *A47J 43/046* (2013.01); *A47J 31/4485* (2013.01)

(58) Field of Classification Search
CPC ...................................................... A47J 43/046
USPC ................................. 366/192–194, 205, 314
See application file for complete search history.

(56) References Cited

U.S. PATENT DOCUMENTS

| 388,724 A | * | 8/1888 | Schumm | B01F 3/04531 366/170.3 |
| 1,507,880 A | * | 9/1924 | Zouvelos | A47J 19/02 366/155.1 |
| 1,885,416 A | * | 11/1932 | Connelly | A45D 27/12 366/165.3 |

(Continued)

FOREIGN PATENT DOCUMENTS

| EP | 2298142 | 3/2011 |
| WO | 2010023312 | 3/2010 |

*Primary Examiner* — David L Sorkin
(74) *Attorney, Agent, or Firm* — K&L Gates LLP

(57) ABSTRACT

Device (100) for producing fluid foam comprising: a container (10) where the fluid can be introduced; a foaming tool (20) being rotatable in the inner volume of the container (10), able to mix and foam the fluid; at least one outlet (23) to allow dispensing of the fluid preparation from the container (10); a base able to hold the container (10) and comprising a driving unit (30) providing the rotation of the foaming tool (20); the at least one outlet (23) being actuated to be open or to be partially or totally closed as a function of one or a plurality of parameters defining the foaming of the fluid inside the container (10), these parameters being: preparation time, fluid temperature, torque exerted by the foaming tool in the fluid, rotational speed of the foaming tool or sense of rotation of the foaming tool.

18 Claims, 3 Drawing Sheets

(56) References Cited

U.S. PATENT DOCUMENTS

| | | | | |
|---|---|---|---|---|
| 1,934,916 | A | * | 11/1933 | Dies ........................ A47L 15/08 |
| | | | | 134/182 |
| 2,070,545 | A | * | 2/1937 | Gilbert ...................... B01F 7/26 |
| | | | | 366/145 |
| 4,620,794 | A | * | 11/1986 | Leka ................... B01F 15/0404 |
| | | | | 222/137 |
| 5,947,645 | A | * | 9/1999 | Rixom ...................... B01F 7/30 |
| | | | | 222/58 |
| 2002/0080678 | A1 | * | 6/2002 | Daniels, Jr. ........... A47J 43/046 |
| | | | | 366/205 |
| 2003/0142581 | A1 | * | 7/2003 | Barton ................. A47J 43/082 |
| | | | | 366/142 |

* cited by examiner

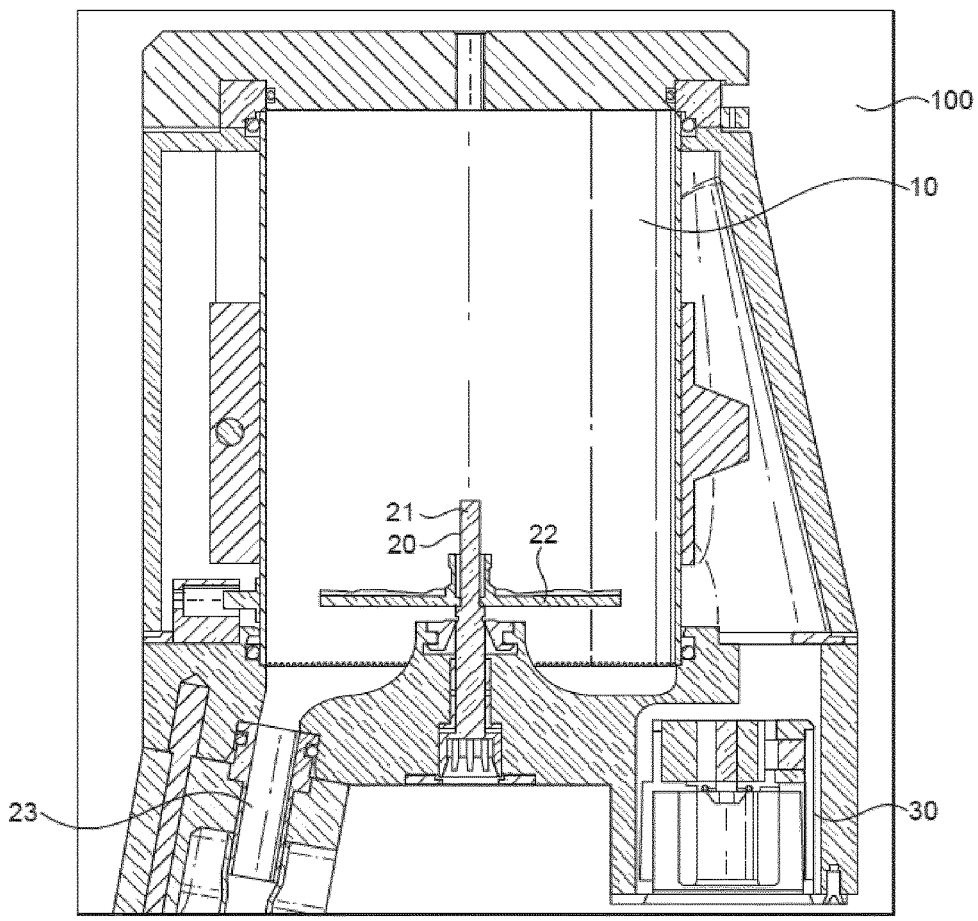
FIG. 1
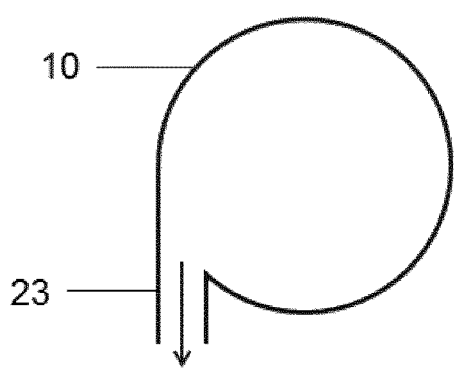
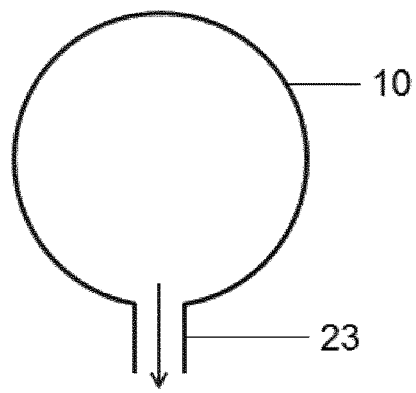
FIG. 2a          FIG. 2b

FOAMING DEVICE WITH CONTROLLED OUTLET

CROSS REFERENCE TO RELATED APPLICATIONS

The present application is a National Stage of International Application No. PCT/EP2016/069565, filed on Aug. 18, 2016, which claims priority to European Patent Application No. 15183882.8, filed on Sep. 4, 2015, the entire contents of which are being incorporated herein by reference.

FIELD OF THE INVENTION

The present invention is directed to a foaming device for foaming a fluid, more particularly the invention is directed to device for foaming milk, the foaming device comprising an outlet actionable as a function of certain parameters.

BACKGROUND OF THE INVENTION

Foams consist of two phases, an aqueous phase and a gaseous (air) phase, so fluid foam is therefore a substance which is formed by trapping many gas bubbles in a fluid structure. Producing a fluid foam involves not only the generation of these gas bubbles, but also the packing and the retention of these bubbles into the overall fluid structure in order to provide a stable foam.

When foaming a fluid, the main difficulties to be faced are to produce the foam desired in a controlled and repeatable way and also to stabilize the foam and to keep it stable for a given period of time.

Devices for foaming milk are known in the state of the art, wherein the foaming of the milk is typically carried out by a rotating part moving inside a reservoir or container where milk is arranged. Typically, this rotating part is configured as a whisk which is provided at the bottom part of the container. Milk foaming occurs by agitation of the milk which in turn traps air inside the liquid film. However, the problem with these known devices is that a precise control and regulation of the characteristics of the foam obtained is very hard to achieve, and repeatability of the process becomes a primary issue.

Also, the state of the art includes devices that inject hot steam into milk that is filled into a container, in order to cause foaming. However, a precise control of the foaming process followed, and repeatability is typically an issue in these known devices.

Also, in the state of the art devices, there are several factors that influence the foaming of the milk as, for example, the speed of the rotating part or the temperature and/or pressure of the steam that is injected into the milk.

Moreover, in the mixing and/or foaming devices known in the prior art the outlet is typically always maintained open, and the mixture delivered in the cup does not have the same characteristics throughout the process: in fact, either a more liquid foam (not stable) or a not properly mixed composition is delivered at the beginning and later, either a thicker (and more stable foam) or a better mixed composition is delivered afterwards. In case of foaming devices, typically the foam remaining in the container is too thick to be delivered through the outlet in most of the cases, which presents a strong hygienic problem and therefore requires frequent cleaning of the container and of the complete device.

Therefore, the present invention is directed to a device for foaming a fluid, preferably for foaming milk, having a controlled outlet that is operable as a function of certain parameters, in order to avoid the drawbacks of the known prior art.

OBJECT AND SUMMARY OF THE INVENTION

According to a first aspect, the invention relates to a device for producing fluid foam comprising: a container where the fluid can be introduced; a foaming tool rotatable in the inner volume of the container, able to mix and foam the fluid; at least one outlet to allow dispensing of the fluid preparation from the container; a base able to hold the container and comprising a driving unit providing the rotation of the foaming tool. The at least one outlet of the device of the invention is actuated to be open or to be partially or totally closed as a function of one or a plurality of parameters defining the foaming of the fluid inside the container.

Preferably, the outlet is actuated as a function of one or a combination of the following parameters: preparation time, fluid temperature, torque exerted by the foaming tool in the fluid, rotational speed of the foaming tool or sense of rotation of the foaming tool.

According to the invention, the at least one outlet is preferably arranged in the container in such a location that allows dispensing of the fluid preparation from the container by gravity. Also preferably, the at least one outlet is sufficiently flexible to be reliably pressed and/or pinched to be partially or totally closed.

Typically, the driving unit in the device of the invention is either mechanically coupled to the foaming tool or it generates a magnetic field in response to which the foaming tool is made to rotate inside the container.

According to an embodiment of the invention, the speed of rotation of the foaming tool at the end of the recipe preparation is equal or less than the speed of rotation of the foaming tool during the preparation process, and its sense of rotation can be reversed.

Preferably, the at least one outlet in the device of the invention is removable from the rest of the device and/or is deployable so as to allow its cleaning.

According to a possible arrangement, the at least one outlet is arranged either radially or tangentially with respect to the container, preferably at a low position.

According to another possible arrangement, the at least one outlet is arranged either perpendicular with respect to the axis of the container or parallel with respect to the axis of the container.

Another arrangement according to the invention is that the at least one outlet is arranged inclined an angle α with respect to the axis of the container, α being typically comprised between 0° and 180°.

Still another arrangement is that the container is arranged inclined a certain angle β with respect to the base holding the said container, β being comprised between 0° and 90°, preferably being either 0° or comprised between 5° and 45°.

Preferably, the foaming tool comprises one or a plurality of disturbing elements, preferably one or a plurality of undulations. Also preferably, the foaming tool further comprises one or a plurality of apertures to compensate suction effect when the foaming tool rotates in the container.

According to the invention, it is also possible that the device comprises two outlets arranged one above the other in the container, typically arranged one above the other in the container, each outlet being independently actuated to be open or to be partially or totally closed as a function of one or a plurality of parameters defining the foaming of the fluid inside the container.

Preferably, the outlets are sequentially operated as a function of a targeted recipe to be delivered.

Also typically, the device of the invention can further comprise a heating unit able to heat the fluid.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIG. 1 shows a general cut view of a foaming device with a controlled outlet according to the present invention.

FIGS. 2a and 2b show two possible arrangements, tangential or radial, of the outlet of a foaming device with a controlled outlet according to the present invention.

DETAILED DESCRIPTION OF EXEMPLARY EMBODIMENTS

Figure 3A:
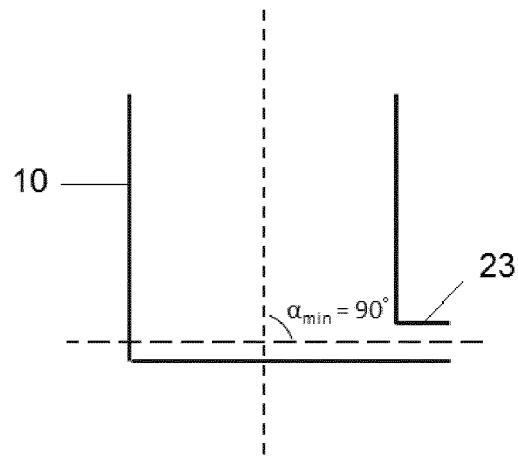
FIGS. 3a and 3b show two possible arrangements, horizontal or vertical, of the outlet of a foaming device with a controlled outlet according to the present invention.

As schematically represented in FIG. 1 attached, the present invention refers to a foaming device 100 comprising a container 10 where a fluid to be foamed is arranged and a foaming tool 20. The foaming tool 20 moves with respect to the container 10 which is static, typically rotating around a shaft 21. The foaming tool 20 is preferably configured as a disc or a whisk 22 and rotates around the shaft 21 which is typically arranged in the center of the whisk.

Besides, the foaming device 100 of the invention comprises a driving unit 30 configured to entrain in rotation the foaming tool 20: in fact, it entrains in rotation the vertical shaft 21 which is joined to the whisk 22. The foaming device 100 of the invention further comprises an outlet 23, through which the foamed fluid is dispensed, once prepared. Typically, the outlet 23 is made flexible, preferably made of silicone, and it can be controlled or operated (it can be at least partially closed, typically by pressing or pinching the flexible conduct configuring the outlet 23).

According to the invention, the outlet 23 is controlled by the device in such a way that it remains closed during at least a part of the foaming process inside the container 20 and is opened in a controlled way once certain parameters determining the foaming characteristics of the fluid are reached, as it will be further explained in detail in what follows of the present Description.

Preferably, according to the invention, the foaming tool 20 is arranged centered inside the container 10, meaning that the vertical shaft 21 will be arranged at the center of the container 10, i.e. aligned with the container axis. However, it is also possible that the foaming tool is arranged decentralized with respect to the center or inner volume of the container 10, i.e. the vertical shaft 21 will be then arranged offset with respect to the axis of the container. Also according to another possible arrangement of the device of the invention, the foaming tool 20 (in particular the whisk 22) can be arranged tilted or inclined inside the inner volume of the container 10, i.e. inclined with respect to the container axis.

The driving unit 30 of the invention can either comprise a motor directly coupled and entraining in rotation the vertical shaft 21 or it can also be mechanically decoupled from the foaming tool 20: in the second case, the driving unit 30 will generate a magnetic field in response to which the whisk 22 will be made moveable inside the container 10 around the vertical shaft 21. Therefore, in this case, the driving unit 30 and the whisk 22 will be separated a certain distance such that it will allow the whisk 22 be at least partially positioned inside the magnetic field generated by the driving unit 30. In this embodiment, the driving unit 30 will preferably comprise at least one first magnet and the whisk 22 will also comprise at least one second magnet, such that the at least one first magnet and the at least one second magnet will be adapted to contactlessly transfer a rotation of the driving unit 30 onto the whisk 22. Due to the fact that the whisk 22 is driven magnetically, there will be less friction in the foaming tool 20 (between the shaft 21 and the whisk 22) resulting in less energy consumption and a longer life time of the device.

Typically, the driving unit 30 is configured in such a way that it provides a base onto which the foaming device 100 can be placed, as represented in FIG. 1.

According to the invention, the container 10 is preferably configured as a jug or the like that can be easily separated from the rest of the device 100, in particular from the driving unit 30, so as to allow its easy cleaning. Also according to the invention, either cold, hot or ambient foams can be prepared with the device 100.

The outlet 23 can therefore vary from a position where it is completely open, to a position where it is at least partially closed or completely closed. By modifying the compression made to the flexible tube, the aperture level can be varied and adjusted as desired, controlled as well as a function of certain parameters that will define the foaming process of the fluid. Preferably, the closing of the outlet 23 is made automatically by the device 100, as a function of the mentioned parameters.

Typically, the actuation of the outlet 23 in the device of the invention is made automatically so the user does not need to act it. Preferably, this is made by a motor actuating a pinching or pressing element that, once actuated, is pressed over the outlet 23 which, as it is made sufficiently flexible, is compressed or pinched so that it partially or totally closes the exit of the product. Any mechanical arrangement allowing such function would be possible and comprised within the scope of the present invention. An advantage of such an arrangement is that the pinching element or mechanical arrangement is actually only touching the external part of the outlet 23, so there is no contact with the fluid and no risk of contamination.

Figure 6A:
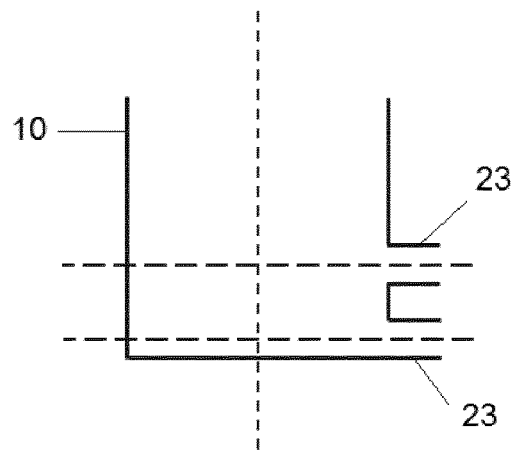
FIGS. 6a and 6b show possible arrangements of two outlets in a foaming device with controlled outlets according to the present invention.
Figure 6B:
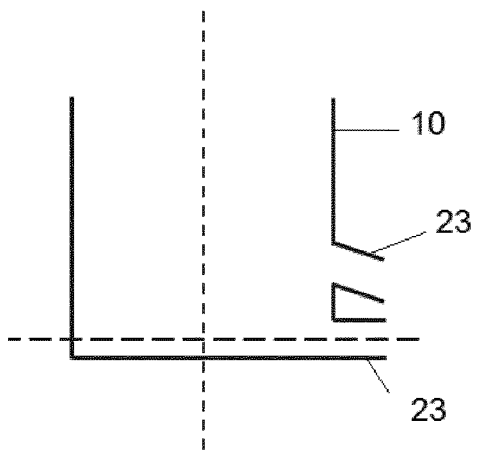

FIGS. 6a and 6b show the arrangement where instead of only one outlet 23, there are two outlets, typically arranged one above the other. Each outlet is controlled separately and is pinched or compressed also separately. Typically, the outlet arranged on the lower part of the container dispenses the fluid or liquid fluid and the outlet arranged above this outlet will dispense the fluid foam instead. These two outlets are controlled independently and are partially or totally closed by means of separate pinching elements. That is to say, by making an independent control of the aperture of each outlet, a recipe can be delivered by the device of the invention, as different layers of foam and/or fluid can be placed one over the other, as desired, simply by actuating the outlets differently and/or sequentially.

The parameters defining the foaming and which control the opening/closing of the outlet 23 are typically: time elapsed for the preparation of the foam, temperature of the fluid or foamed fluid inside the container 10, torque exerted by the whisk 22 (directly related to density and viscosity of the fluid in the container), rotational speed of the whisk 22, direction of rotation of the whisk 22, amongst others. Typically, the device of the invention controls one or a plurality of these parameters and opens or closes (either completely or to a certain degree) the outlet 23, as these parameters directly influence the foaming characteristics of the fluid. As an example, at the beginning of the preparation process in the device, the outlet 23 is completely closed: typically, the fluid inside the container 10 is at a low temperature (ambient or cold), as the whisk 22 starts rotating within the container 10, which makes the temperature of the fluid be increased. During this process, the direction of rotation of the whisk and its rotational speed have certain values depending on the type of foam intended. Further, by measuring the torque exerted by the whisk 22, the density or viscosity of the foam can also be inferred so the parameters of time elapsed, temperature of the fluid and torque (assuming rotational speed value and direction of rotation are not changed) provide the device 100 with the information on the type of foam already being prepared, which can then automatically trigger an opening (either total or to a certain degree) of the outlet 23. This obviously allows the dispensing of the foam prepared in the device.

Preferably, also according to the invention, at the end of the process and in order to help the total dispensing and evacuation of any remaining foam within the container 10 (what can be called evacuation process, distinguished from the preparation or foaming process), the rotation of the whisk 22 can remain the same and be made at the same speed, or it can be lowered (even up to the complete stop of the whisk 22) and it can also be reversed, either at the nominal speed used or at a lower speed.

The process mentioned above can either be automatically controlled by a control system connected to the device 100 or it can also trigger certain actions to be done or effected by the user. In any of the cases, the foaming process will be controlled inside the device and the outlet 23 will be actuated according to the desired values or characteristics of the fluid foam to obtain (in fact, we could talk of the recipe's values).

Even when comprised in the scope of the invention that the outlet 23 can be partially open or closed, its typical functioning will be to be either completely closed or completely open: closed at the beginning of the foaming process and open once the foam has been prepared and is dispensed in a cup or the like (obviously, during the evacuation process of the remaining foam inside the container, the outlet 23 remains open).

According to the invention, the outlet 23 can be made removable from the rest of the device 100 and can also be made deployable, in order to allow its easy cleaning. The diameter of the outlet 23 is typically comprised between 2 and 20 mm, preferably between 4 to 10 mm. The tube of the outlet 23 is made flexible, with hardness such that allows it to be reliably pinched or compressed to at least its partial closure. The outlet 23 will typically have a hardness comprised between 40 and 70 Shore.

Figure 3B:
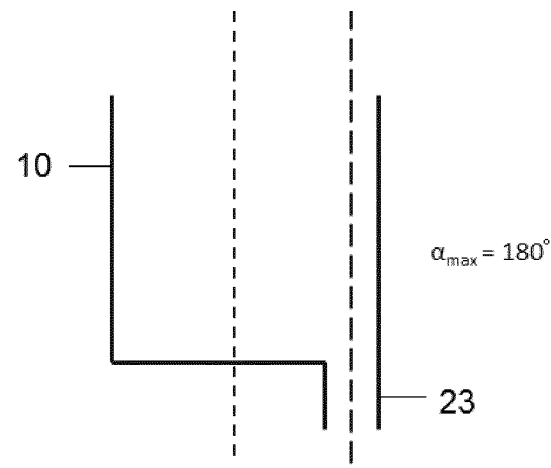
Figure 4A:
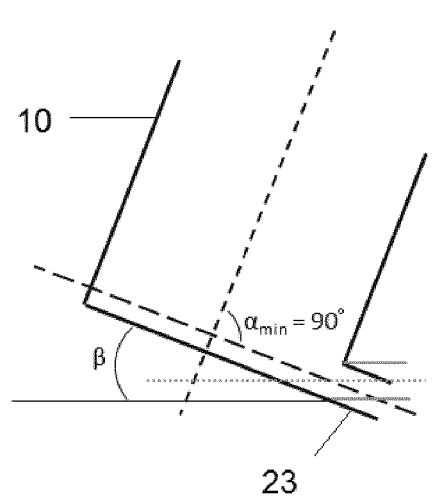
FIGS. 4a and 4b show possible arrangements of the container being tilted, the outlet being horizontal or vertical respectively, in a foaming device with a controlled outlet according to the present invention.
Figure 4B:
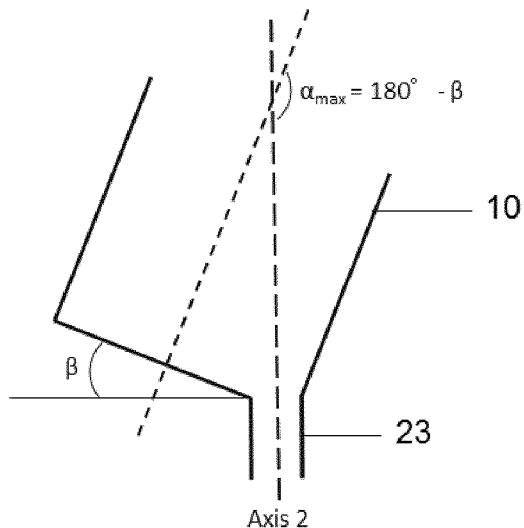

Furthermore, different embodiments or executions of the device of the invention are possible, as shown in the Figures attached. The outlet 23 can be inclined a certain angle alpha ($\alpha$) with respect to the shaft 21, alpha being comprised between 90° and 180°. Typically, the outlet 23 is arranged at the peripheral diameter of the container base, either arranged tangentially or radially with respect to the container base periphery, as shown in FIGS. 2a and 2b; preferably, the outlet 23 is arranged in the lower part of the container. Another arrangement is shown for example in FIGS. 3a-b, where the outlet 23 can be arranged either perpendicularly to the shaft 21 or parallel to the axis shaft 21 (i.e., vertically arranged, as the container 10 or jug). It is also possible (see FIGS. 4a, 4b) that the container 10 is arranged inclined with respect to a base where the driving unit 30 is arranged: an angle beta ($\beta$) will be formed with respect to the mentioned base, the angle $\beta$ being typically comprised between 0° and 90°, preferably being either 0° or being comprised between 5° and 45°.

It is also possible that the device 100 further comprises a led or similar alerting element which blinks or changes color after the recipe and foaming process has ended, so that the user is aware of the termination of the process.

Figure 5A:
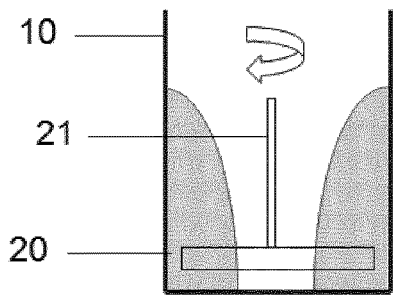
FIGS. 5a and 5b show two possible arrangements of the container, horizontal or tilted, in a foaming device with a controlled outlet according to the present invention.
Figure 5B:
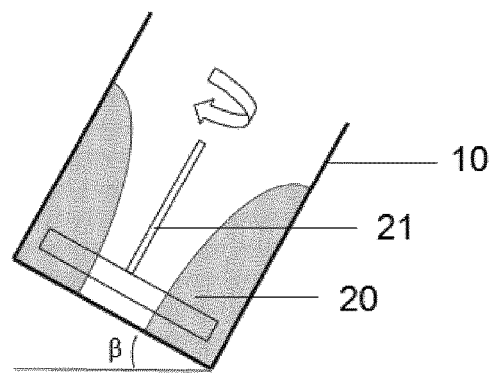

As represented in FIG. 5a, when the container is arranged vertically in the device 10, it is preferred that the whisk 22 comprises disturbing elements which help the incorporation of air within the fluid structure in order to foam the fluid, enhancing the vortex created by the whisk rotation. The case represented in FIG. 5b would preferably comprise a flat whisk, arranged within a container 10 that is inclined or tilted with respect to the horizontal base an angle beta ($\beta$): in this case, the inclination of the container 10 would be sufficient to incorporate air in order to foam the fluid, and disturbing elements in the whisk 22 would not be essential. When the whisk 22 is made flat, an advantage is that it is easier to clean as there are no cavities where fluid can be kept or can remain. The whisk 22 can also comprise apertures to compensate the suction effect created when the whisk rotates close to the bottom of the container without the whisk having too high suction resistance. For enhancing foaming, the whisk 22 can further comprise one or a plurality of disturbing elements, typically provided in the shape of an undulation. These undulations typically have a depth comprised between 0.5 and 5 mm, more preferably of 1 mm. The undulations are provided in one of the faces of the whisk 22, or on both faces, or can even be provided on the inner walls of the container 10, typically in the lower inner walls where the fluid typically moves.

Besides, as represented in FIGS. 6a-b, the device of the invention can comprise more than one outlet 23, typically two, preferably arranged one above the other: this execution is advantageous in the case of delivering foam and fluid prepared in the container, the lower outlet dispensing the liquid part and the upper outlet dispensing the foam. Both outlets are also controlled as explained previously for the case of one outlet only.

Foams having different properties can be obtained with the device of the invention, liquid foams having a small size of bubbles typically known as micro foams (used for preparing latte art compositions, for example) or thicker foams with higher size of bubbles inside.

As values for typical rotational speeds of the whisk 22, the invention will rotate the whisk at a speed comprised between 2000 rpm and 8000 rpm, preferably between 2500 rpm (giving more liquid foam with low bubble size) and 4000 rpm (providing a thicker foam) during the foaming process. Typically, during the evacuation process of the remaining foam inside the container, the whisk will rotate at a lower speed, preferably comprised between 300 rpm and 500 rpm.

The most typical configuration of the container 10 of the invention is the straight cylindrical one. However, it is also possible that the external shape of the container 10 is made straight cylindrical, while the inner cavity of the container is for example conical-truncated. However, it is clear that any other shape or configuration of the container would also be possible and comprised within the scope of the present invention.

In the following, the description of the present invention is given in view of foaming of milk. However, the invention is not limited to milk as a fluid, but can also be applied to other fluids, e.g. chocolate, coffee, etc. Consequently, other foams different to milk foam can be achieved by the present invention as well. When talking about milk in the present invention, it should be understood not only pure milk but also foaming-based fluids made from foaming agents like caseins, proteins, or others. Also in the present invention, frothing and foaming are to be understood as synonyms.

The foaming device of the invention can provide cold, chilled, ambient and/or hot foam. For providing hot fluid foams, the foaming device 100 preferably further comprises a heater or a heating unit which can enhance the foaming effect due to additional available energy and/or protein denaturation. Further, hot milk foam is typically desired for preparing beverages like cappuccino or the like. The heater can be integrated either in the foaming tool 20 or in the container 10 or in the base 30.

The foaming device 100 of the invention can also comprise a lid or cover useful for avoiding splashing when the foaming of the fluid takes place.

Although the present invention has been described with reference to preferred embodiments thereof, many modifications and alternations may be made by a person having ordinary skill in the art without departing from the scope of this invention which is defined by the appended claims.

The invention claimed is:

1. A device for producing fluid foam, the device comprising:
   a container where a fluid can be introduced;
   a foaming tool being rotatable in an inner volume of the container, the foaming tool able to mix and foam the fluid;
   a first outlet and a second outlet, each of the first outlet and the second outlet configured for independently dispensing of the fluid from the container; and
   a base able to hold the container and comprising a driving unit providing the rotation of the foaming tool,
   wherein each of the first outlet and the second outlet are configured to be independently actuated between: (i) an open position and (ii) a partially or totally closed position, as a function of one or a plurality of parameters defining the foaming of the fluid inside the container,
   wherein each of the first outlet and the second outlet are sufficiently flexible to be independently reliably pressed and/or pinched to be partially or totally closed,
   wherein each of the first outlet and the second outlet are positioned on a sidewall of the container, the sidewall positioned between a top portion and a bottom portion of the inner volume of the container, and
   wherein at least a portion of the sidewall extends above the first outlet and at least a portion of the sidewall extends below the first outlet.

2. The device according to claim 1 wherein is each of the first outlet and the second outlet are configured to be actuated as a function of at least one parameter selected from the group consisting of: preparation time; fluid temperature; torque exerted by the foaming tool in the fluid; rotational speed of the foaming tool; and sense of rotation of the foaming tool.

3. The device according to claim 1 wherein each of the first outlet and the second outlet are arranged in the container in a location that provides for dispensing of the fluid from the container by gravity.

4. The device according to claim 1 wherein the driving unit is either: (i) mechanically coupled to the foaming tool or (ii) generates a magnetic field to rotate the foaming tool inside the container.

5. The device according to claim 1 wherein the speed of rotation of the foaming tool at an end of a recipe preparation is equal or less than a speed of rotation of the foaming tool during the recipe preparation, and wherein the direction of rotation of the foaming tool can be reversed.

6. The device according to claim 1 wherein each of the first outlet and the second outlet are removable from the rest of the device and/or deployable to allow for cleaning of each of the first outlet and the second outlet.

7. The device according to claim 1 wherein second outlet is arranged either radially or tangentially with respect to the container.

8. The device according to claim 1 wherein second outlet is arranged either perpendicular with respect to a central axis of the container or parallel with respect to the central axis of the container.

9. The device according to claim 1 wherein second outlet is arranged inclined at an angle with respect to a central axis of the container.

10. The device according to claim 1 wherein the container is arranged inclined at an angle with respect to the base holding the container.

11. The device according to claim 1 wherein the foaming tool comprises one or a plurality of disturbing elements.

12. The device according to claim 1 wherein the foaming tool comprises one or a plurality of apertures configured to compensate for a suction effect when the foaming tool rotates in the container.

13. The device according to claim 1 wherein each of the first outlet and the second outlet are sequentially operated as a function of a targeted recipe to be delivered.

14. The device according to claim 11 wherein the one or a plurality of disturbing elements comprises one or a plurality of undulations.

15. The device according to claim 1 wherein the foaming tool is a flat whisk.

16. The device according to claim 1 further comprising a lighting element configured to indicate when the foaming of the fluid in the container has ended.

17. The device according to claim 1 wherein the first outlet and the second outlet are vertically arranged along a vector that is parallel but not collinear with respect to a centreline of the container.

18. The device according to claim 1 wherein each of the first outlet and the second outlet comprises a centerline, and the centerlines of the first outlet and the second outlet are not parallel.

* * * * *